(12) United States Patent
Mahajan

(10) Patent No.: US 8,335,192 B2
(45) Date of Patent: Dec. 18, 2012

(54) SELECTIVELY TRANSITIONING BETWEEN PHYSICAL-LAYER NETWORKS DURING A STREAMING COMMUNICATION SESSION WITHIN A WIRELESS COMMUNICATIONS SYSTEM

(75) Inventor: Manish Mahajan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 12/758,949

(22) Filed: Apr. 13, 2010

(65) Prior Publication Data

US 2011/0250869 A1 Oct. 13, 2011

(51) Int. Cl.
*H04W 4/00* (2009.01)
(52) U.S. Cl. ........ 370/331; 370/332; 370/338; 370/352; 370/465; 455/436; 455/437; 455/552.1; 709/227; 709/230; 709/231
(58) Field of Classification Search ........... 370/310, 370/328, 331–333, 338, 352, 465; 455/127.4, 455/412.1, 412.2, 414.1, 418–420, 432.1, 455/436–445, 448, 456.1, 518, 524, 525, 455/550.1, 552.1, 553.1; 709/203, 227–231
See application file for complete search history.

(56) References Cited

U.S. PATENT DOCUMENTS

| | | | | |
|---|---|---|---|---|
| 7,920,523 B2* | 4/2011 | Grinshpun et al. | ........... | 370/331 |
| 8,095,175 B2* | 1/2012 | Todd et al. | ................. | 455/552.1 |
| 2007/0259651 A1* | 11/2007 | Bae et al. | ................... | 455/412.1 |
| 2009/0190533 A1* | 7/2009 | Zhu et al. | ........................ | 370/328 |
| 2009/0257417 A1* | 10/2009 | Allen et al. | ..................... | 370/338 |
| 2009/0316669 A1* | 12/2009 | Javaid et al. | .................. | 370/338 |
| 2010/0040020 A1* | 2/2010 | Chen | ............................. | 370/331 |
| 2011/0040836 A1* | 2/2011 | Allen et al. | ..................... | 709/205 |
| 2011/0044184 A1* | 2/2011 | Balasaygun et al. | .......... | 370/252 |
| 2011/0188451 A1* | 8/2011 | Song et al. | ..................... | 370/328 |
| 2011/0201336 A1* | 8/2011 | Garrett et al. | ................. | 455/436 |

FOREIGN PATENT DOCUMENTS

EP 1435748 A1 7/2004

OTHER PUBLICATIONS

International Search Report and Written Opinion—PCT/US2011/030459, International Search Authority—European Patent Office—Aug. 24, 2011.

* cited by examiner

*Primary Examiner* — Anthony Addy
(74) *Attorney, Agent, or Firm* — Raphael Freiwirth

(57) ABSTRACT

Embodiments are directed to a network-connection report is received at a server (e.g., a presence server) from a first user equipment (UE) that identifies a type of physical-layer network to which the first UE is connected. In response to a determination that the first UE is engaged in a communication session with a second UE, the server sends a notification message to the second UE that indicates the type of physical-layer network to which the first UE is connected. The second UE receives the notification message and determines a target physical-layer network for supporting the second UE's participation in the communication session based at least in part on the type of physical-layer network to which the first UE is connected. The second UE selectively transitions to the target network based on the determination.

19 Claims, 10 Drawing Sheets

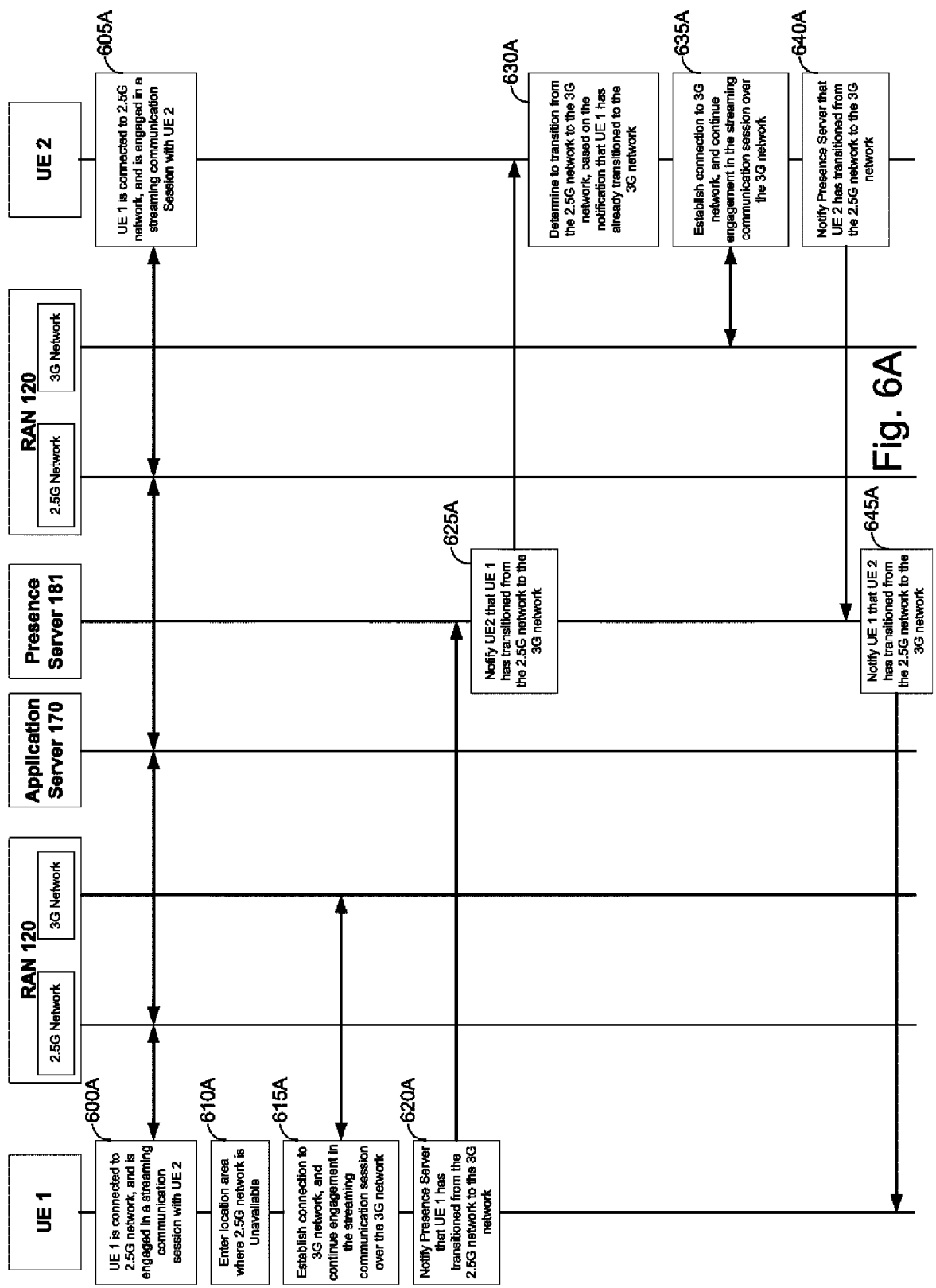

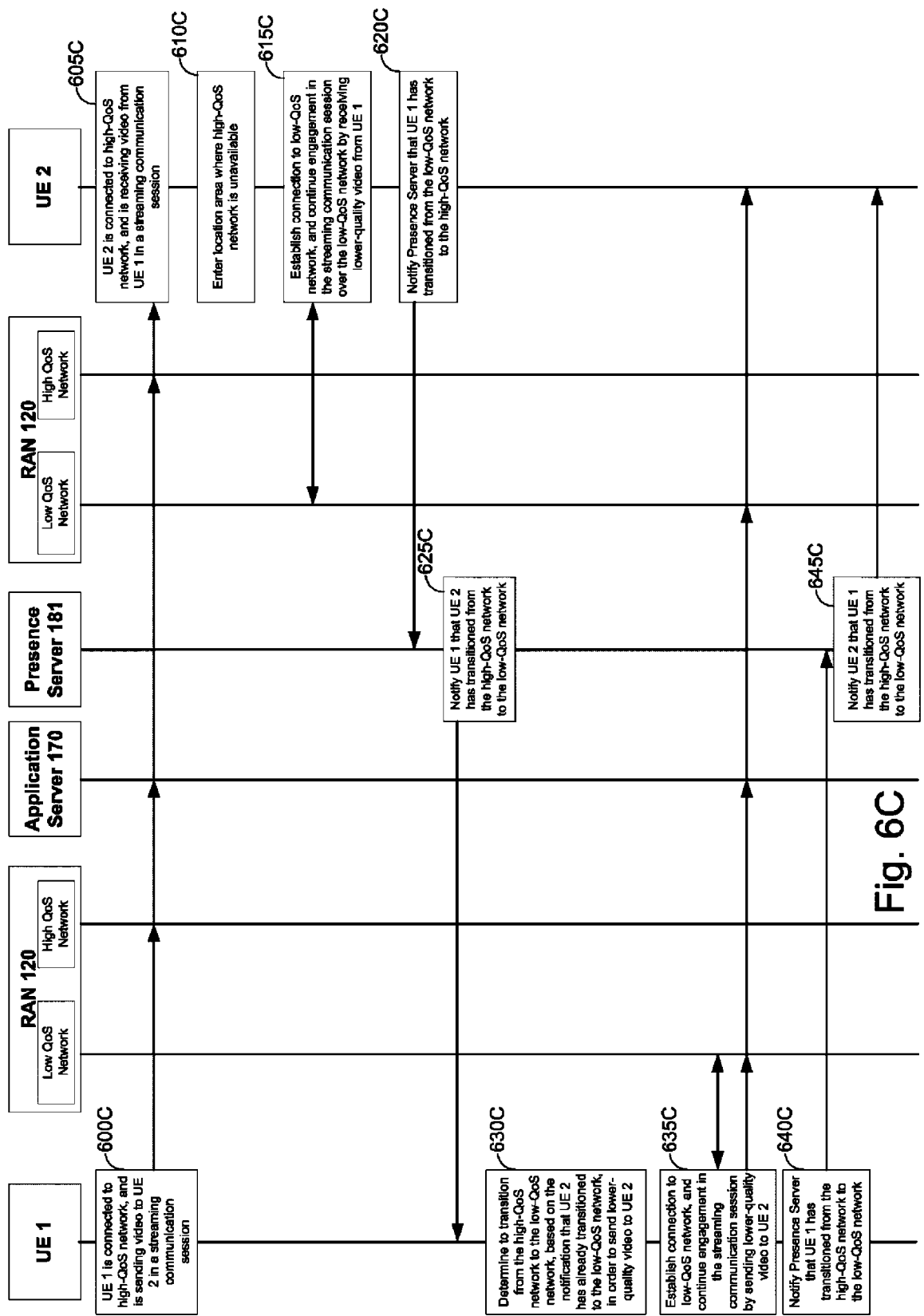

SELECTIVELY TRANSITIONING BETWEEN PHYSICAL-LAYER NETWORKS DURING A STREAMING COMMUNICATION SESSION WITHIN A WIRELESS COMMUNICATIONS SYSTEM

BACKGROUND OF THE INVENTION

1. Field of the Invention

Embodiments of the invention relate to selectively transitioning between physical-layer networks during a streaming communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

Embodiments are directed to a network-connection report is received at a server (e.g., a presence server) from a first user equipment (UE) that identifies a type of physical-layer network to which the first UE is connected. In response to a determination that the first UE is engaged in a communication session with a second UE, the server sends a notification message to the second UE that indicates the type of physical-layer network to which the first UE is connected. The second UE receives the notification message and determines a target physical-layer network for supporting the second UE's participation in the communication session based at least in part on the type of physical-layer network to which the first UE is connected. The second UE selectively transitions to the target network based on the determination.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIGS. 6A through 6C each illustrate an example implementation of the processes of FIGS. 5A and/or 5B in accordance with an embodiment of the invention.

DETAILED DESCRIPTION

Figure 1:
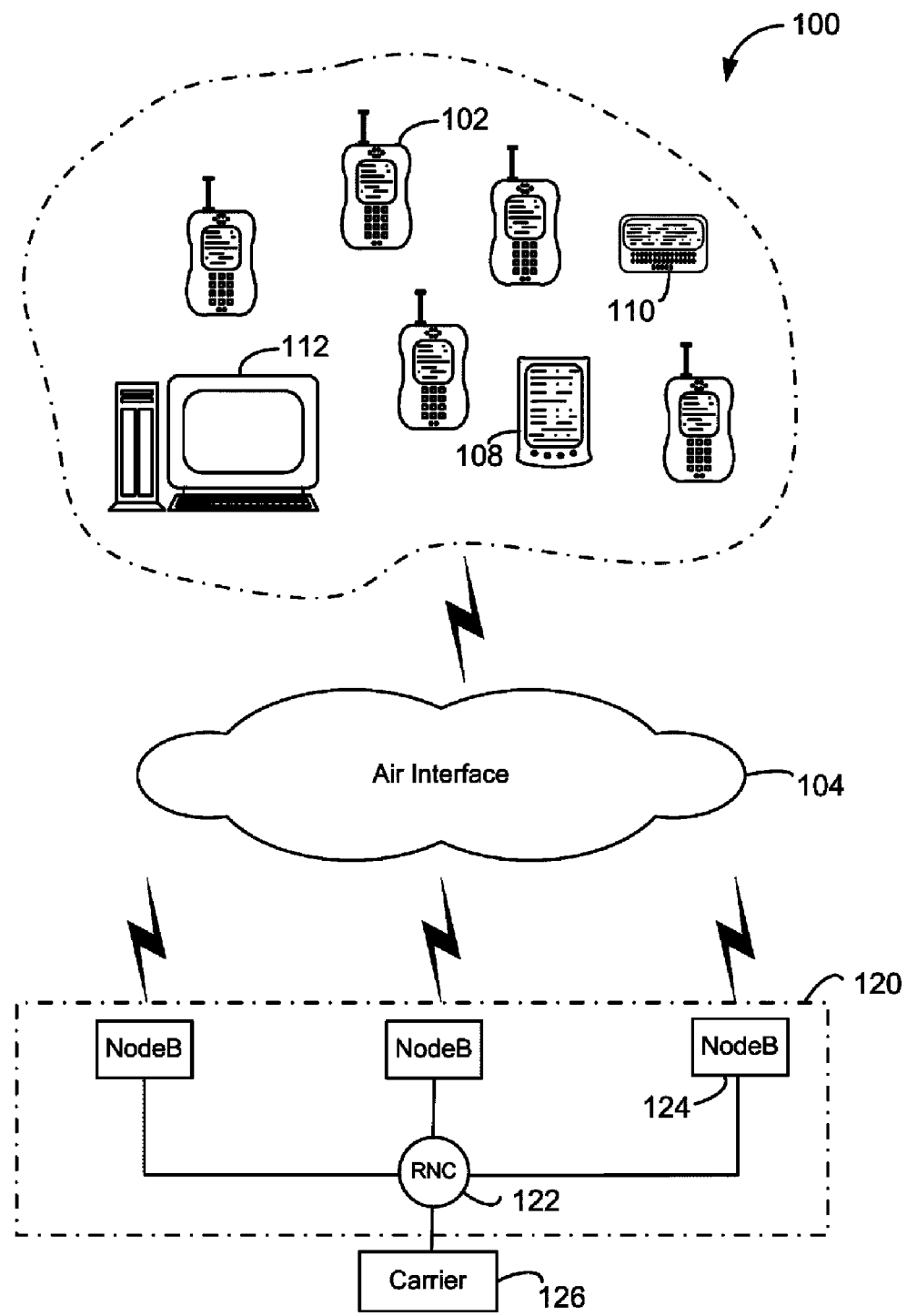
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
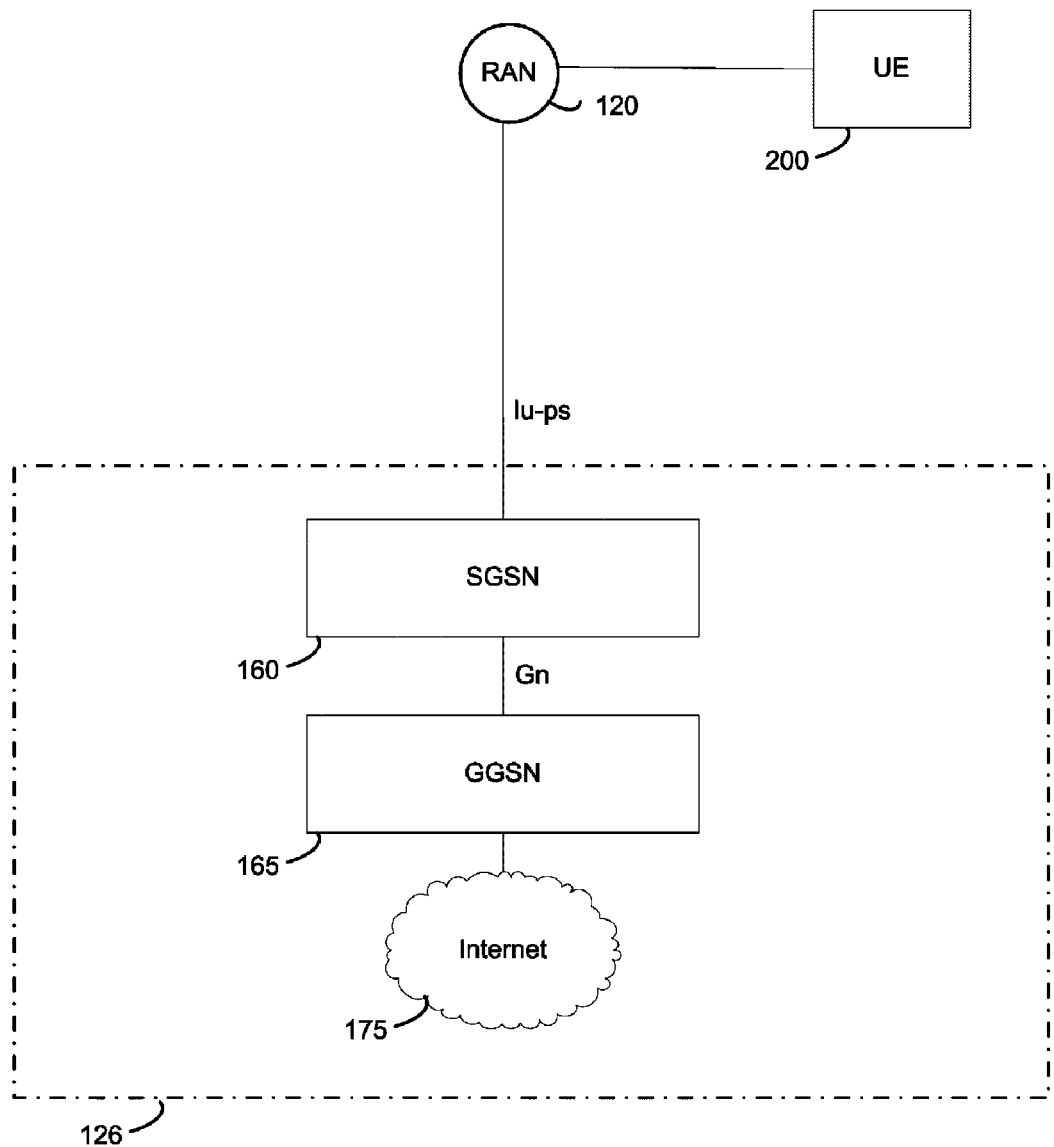
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
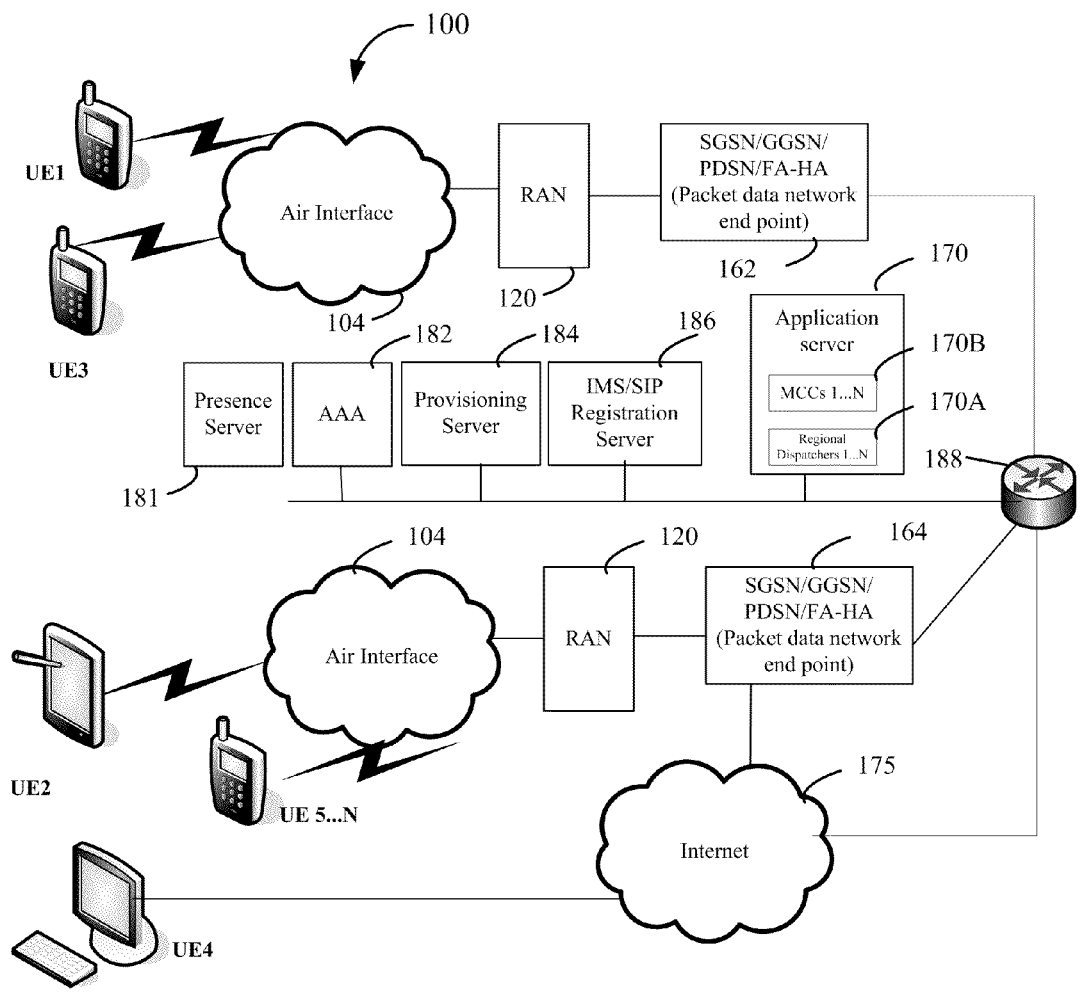
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of a presence server 181, an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the presence server 181, the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Referring to FIG. 2B, the presence server 181 is conventionally responsible for tracking presence of a plurality of users throughout the wireless communications system. For example, the presence server 181 can be configured to determine presence status for users of services that are provided by the application server 170. In this case, users of these services can report their presence status to the presence server on a periodic or event-driven basis, and the presence status of the users can be later used in the event the application server 170 is requested to contact one or more of the users. While presence servers, such as presence server 181, conventionally track presence information for users of the wireless communication system, it will be appreciated that the presence server 181 does not typically monitor the connection type of the physical-layer network (e.g., 2.5G, 3G, 4G, UMTS, EV-DO, 1x, etc.) to which the users are connected.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
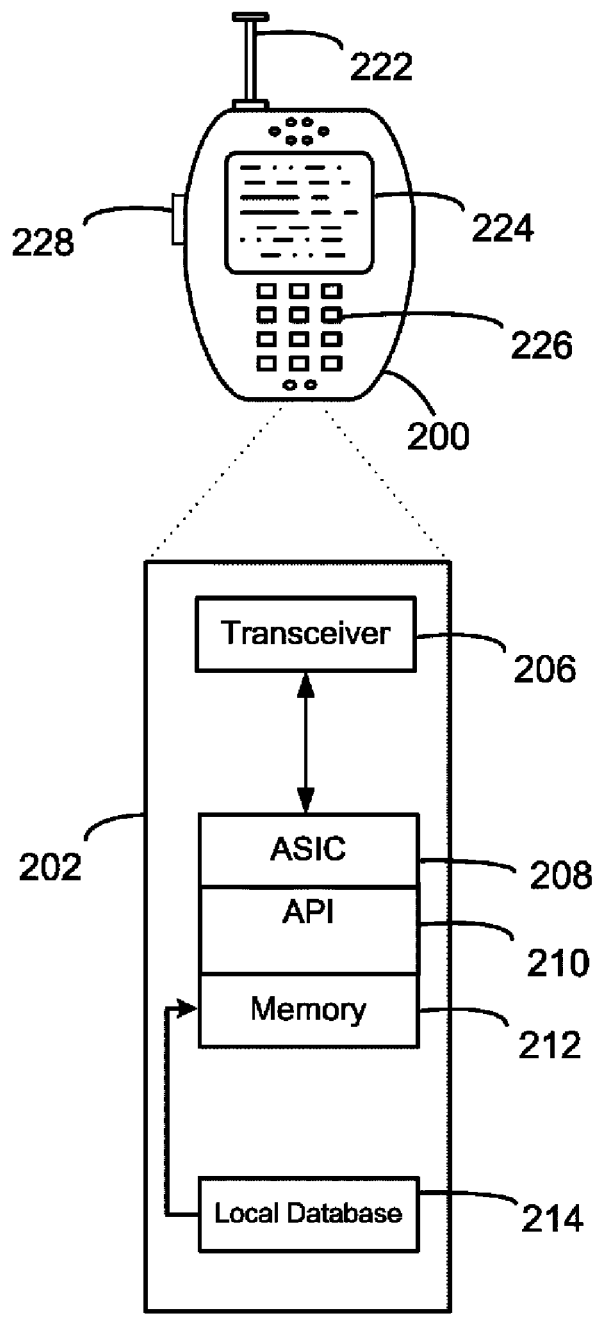
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

Increasingly, UEs are being provisioned with dualmode/dualcamp capability to support multiple physical-layer access networks (e.g., WiFi, GSM/GPRS, HSPA, 2.5G, 3G, 4G, WiMAX, etc.). Different types of physical-layer access networks are associated with different QoS capabilities (e.g., network bandwidth and latency, etc.). With the emergence of 3G and 4G technologies, the QoS gap between different physical-layer access networks has increased further. Conventionally, UEs select their physical-layer access network using rules that are based on the respective UEs' own environments. For example, a given UE may consider criteria such as (i) the given UE's location, (ii) a signal status (e.g., pilot signal strength) associated with local networks near the given UE, (iii) a charging rate for services on different local networks, (iv) a network acquisition hierarchy that defines which networks are preferred over others for the given UE and/or (v) any combination thereof.

However, when the given UE engages in a communication session (e.g., a VoIP session, a phone call, a video streaming session, a push-to-talk (PTT) session, a push-to-transfer (PTX) session, etc.) with one or more other UEs, the given UE will typically not be aware of the type of physical-layer network to which the one or more other UEs are connected. For example, the given UE may select a 3G network in accordance with the given UE's network-selection rules, whereas the one or more other UEs participating in the same communication session may select a 2.5G network in accordance with their own respective network-selection rules and network-availability. Accordingly, the network-connection decision of any particular UE participating in the communication session will not conventionally affect the network-connection decisions of other UEs participating in the communication session.

If the communication session is a QoS-intensive session, such as a streaming multimedia session (e.g., a Push to Live Video or PTX session) between a plurality of UEs, it will be appreciated that the connection-types of the participating UEs to the session can affect the quality and efficiency of the session. For example, assume a streaming communication session is established whereby a first UE ("transmitting UE") is streaming video to a second UE ("receiving UE"). If the transmitting UE is connected to a low-QoS network (e.g., a 1x network, a 2G network, etc.), the quality of the video-stream being transmitted may be relatively low. Despite the low quality of the video-stream from the transmitting UE, the receiving UE establishes a connection to a high-QoS network (e.g., 3G, 4G, etc.) in an attempt to optimize the video-quality for the streaming session. In this case, the resources of the receiving UE are wasted in the sense that a high-QoS network connection is established for the receipt of low-QoS media.

Alternatively, the transmitting UE can be connected to the high-QoS network and the receiving UE can be connected to the low-QoS network. In this scenario, the transmitting-UE sends a high-quality video stream to the receiving UE. However, the low-QoS network to which the receiving UE is connected is not capable of sending the video stream at the high-quality, which prompts the low-QoS network to scale the video stream down to a lower quality level before its transmission to the receiving UE. In this case, the resources of the transmitting UE are wasted in the sense that a high-QoS network connection is established for the transmitting UE and high-quality video is sent from the transmitting UE, but only low-quality video arrives at the receiving UE due to its low-QoS network connection.

As will be appreciated, the above-noted scenarios whereby the transmitting and receiving UEs participate in the communication session on different types of networks associated with different QoS-capabilities can occur either upon set-up of the communication session, or alternatively during a previously established communication session subsequent to a network-handoff of one of the participating UEs.

Accordingly, embodiments of the invention are directed to notifying the presence server 181 of the type of physical-layer network a given UE is using to connect to the RAN 120 of the wireless communications system. Thus, the presence server 181 becomes aware not only of the presence-information for the UE as is known in the art, but also its network-type, from which a performance expectation for a communication link to or from the given UE can be inferred. The presence server 181 can convey the reported network-type of the given UE to one or more other UEs that wish to engage in a communication session with the given UE. These UEs can then selectively modify their own network-connection based on the knowledge of the network connection-type used by the given UE to improve one or more performance parameters associated with the communication session.

Figure 4A:
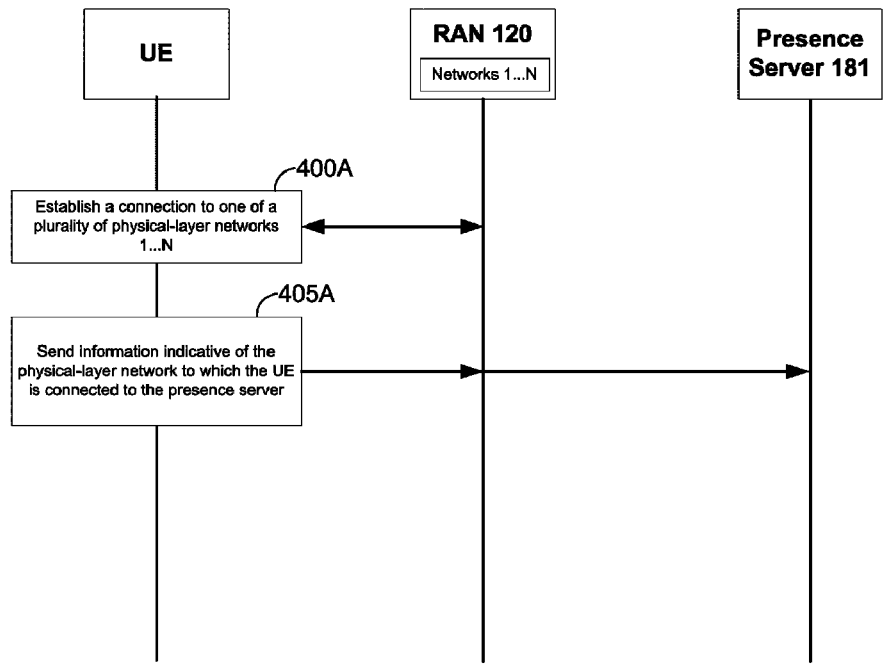
FIG. 4A illustrates a presence-updating process in accordance with an embodiment of the present invention.

FIG. 4A illustrates a presence-updating process in accordance with an embodiment of the present invention. Referring to FIG. 4A, assume that the RAN 120 has N (e.g., where N>=1) different physical-layer networks available for serving UEs within the wireless communications system. For example, networks 1 . . . N can include 2.5G, 3G and 4G networks, EV-DO and UMTS networks, WiFi networks, etc. Each of networks 1 . . . N is associated with a particular performance expectation or QoS-level. However, as will be appreciated, the networks 1 . . . N cannot always satisfy their particular performance expectation. For example, a 3G network that is overloaded may actually deliver performance that is lower than a comparable 2.5G network, despite 3G networks normally being expected to offer superior performance as compared to 2.5G.

Referring to FIG. 4A, a given UE establishes a connection to one of networks 1 . . . N of the RAN 120 in 400A. For example, the connection-establishment of 400A can correspond to setting up a session, such as a point-to-point protocol (PPP) session, whereby the given UE does not necessarily have an active traffic channel (TCH) for engaging in communication sessions and the RAN 120 knows to contact the given UE on the network on which the PPP session is established. In another example, the connection establishment of 400A can correspond to the given UE obtaining resources for engaging in a communication session, such as a TCH and/or QoS resources.

After establishing the network-connection in 400A, the given UE sends, to the presence server 181, information indicative of the physical-layer network-type of the network to which the given UE is connected, 405A. As will be appreciated, the message sent in 405A is an application-layer message that contains information related to the physical-layer connection of the given UE to the RAN 120. In an example, the network-information sent in 405A can be sent along with presence information of the given UE. While not shown in FIG. 4A, upon receiving the network-connection report from the given UE, the presence server 181 updates a record to reflect the given UE's current network-connection type. Accordingly, FIG. 4A shows how the given UE can notify the presence server 181 of its network connection information after establishing a connection to one of networks 1 . . . N.

Figure 4B:
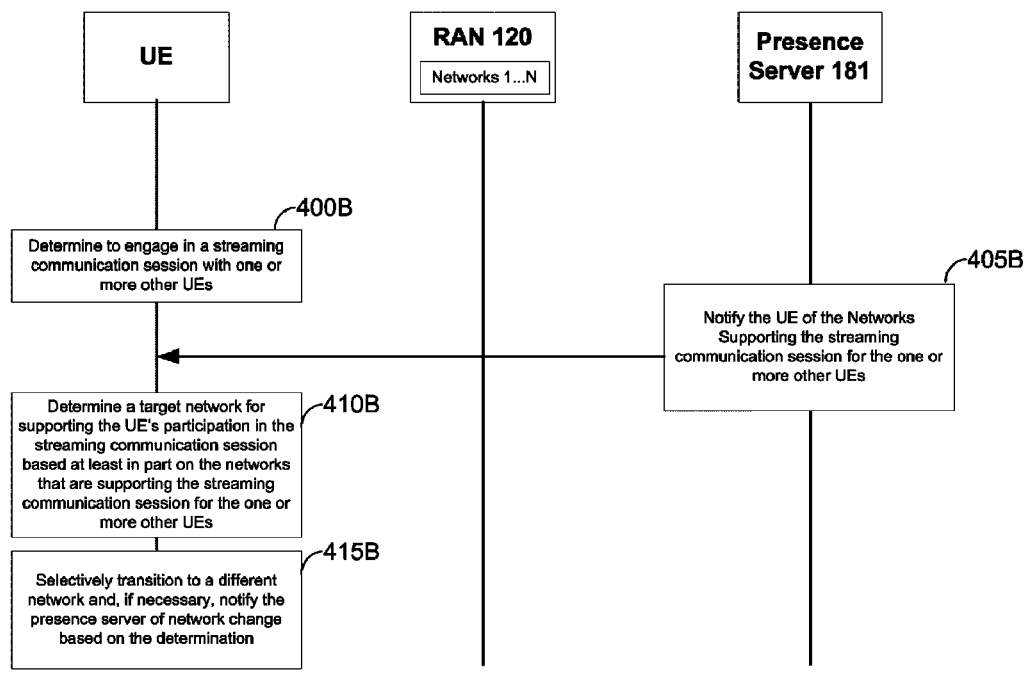
FIG. 4B illustrates a network-notification process in accordance with an embodiment of the present invention.

FIG. 4B illustrates a network-notification process in accordance with an embodiment of the present invention. Referring to FIG. 4B, a given UE determines to engage in a streaming communication session with one or more other UEs, 400B. For example, in 400B, the given UE can determine to receive a video stream from one of the other UEs, the given UE can determine to send a video stream to the one or more other UEs, etc.

At some point after the determination of the given UE to participate in the streaming communication session in 400B, the presence server 181 sends a message to the given UE that notifies the given UE of the types of networks supporting the streaming communication session for the one or more other UEs, 405B. In an example, the presence server 181 can obtain this network-information for the one or more other UEs based on the one or more other UEs performing the process of FIG. 4A, whereby network-connection information is reported to the presence server 181 upon establishment of the network-connection. Further, the notification of 405B can be triggered by the presence server 181 being informed that the given UE is engaged in a communication session with the one or more other UEs. For example, during an in-call phase or set-up phase of a given communication session, the application server 170 can instruct the presence server 181 to notify the participating UEs of the session of their respective network-connection types.

Figure 5A:
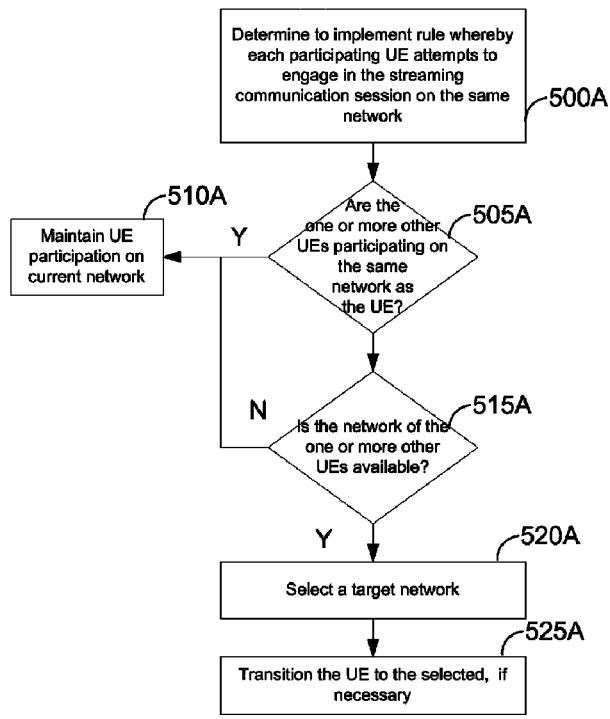
FIGS. 5A and 5B illustrate alternative examples of decision logic that can be implemented by a given user equipment (UE) in determining whether to switch to a different network based on information of network-connections of one or more other UEs participating in a streaming communication session in accordance with embodiments of the present invention.

Upon receiving the notification from the presence server 181 with regard to the network-connection information of the one or more other UEs, the given UE in 410B determines a 'target' network for supporting the given UE's own participation in the streaming communication session based at least in part upon the network-connection information in the notification of 405B. Examples of rules that can be applied by the given UE in making the determination of 410B will be given with respect to FIGS. 5A and 5B below, with implementation examples of the processes of FIGS. 5A and 5C provided with respect to FIGS. 6A through 6C. After determining the target network in 410B, the given UE transitions to the target network, if necessary, 415B. For example, if the target network determined in 410B is different than a current physical-layer network of the given UE, the given UE transitions from the current network to the target network. Alternatively, if the target network determined in 410B is the same as the current physical-layer network of the given UE, the given UE need not perform a network transition.

Figure 4C:
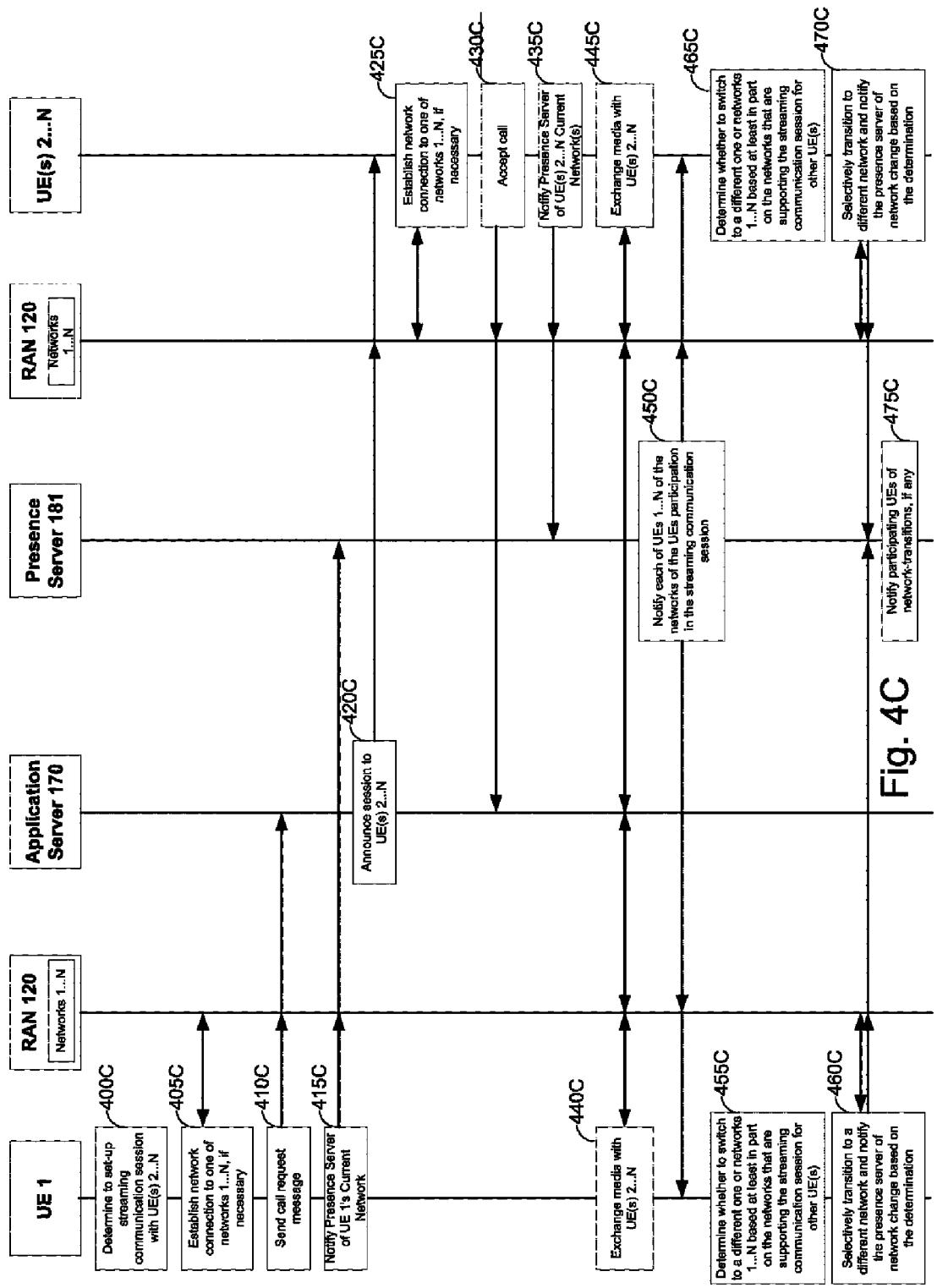
FIG. 4C illustrates an example of the processes of FIGS. 4A and 4B implemented during the set-up of a streaming communication session in accordance with an embodiment of the present invention.

To better explain the concepts of the processes of FIGS. 4A and 4B, FIG. 4C illustrates an example of the processes of FIGS. 4A and 4B implemented during the set-up of a streaming communication session in accordance with an embodiment of the present invention.

Referring to FIG. 4C, UE 1 determines to set-up a streaming communication session with UEs 2 . . . N (e.g., where N>=2), 400C (e.g., as in 400B of FIG. 4B). Accordingly, if N>2, the streaming communication session corresponds to a group communication session (e.g., multicast, multi-unicast, etc), and if N=2, the streaming communication session corresponds to a one-to-one session or unicast session.

Next, if necessary, UE 1 establishes a connection to one of networks 1 . . . N of the RAN 120, 405C (e.g., as in 400A of FIG. 4A). Because UE 1 does not yet have knowledge regarding the network-connections (if any) of UEs 2 . . . N, it will be appreciated that the network upon which UE 1 establishes the connection in 405C can be based on UE 1's own local network-selection rules (e.g., to select WiFi over 3G, 3G over 2.5G, etc., to select the network with a highest pilot signal strength, etc.). In 405C, establishing the network connection includes obtaining call resources (e.g., a TCH, QoS resources, etc.) on the network to support wireless communications to/from UE 1 and the RAN 120.

After establishing the network-connection in 405C, UE 1 sends a call request message on a reverse-link channel to the RAN 120, which forwards the call request message to the application server 170, 410C. Also, after establishing the network-connection in 405C, UE 1 further sends a network-connection report indicating UE 1's current network-connection information on the reverse-link channel to the RAN 120, which forwards the network-connection report to the presence server 181, 415C (e.g., as in 405A of FIG. 4A). While not shown in FIG. 4C, the network-connection report can be sent along with a message indicating UE 1's presence information to the presence server 181. Also, while not shown in FIG. 4C, upon receiving the network-connection report from UE 1, the presence server 181 updates a record to reflect UE 1's current network-connection type.

While the network-connection report of 415C is shown as occurring after the transmission of the call request message in 410C, it will be appreciated that the network-connection report can be sent before the call request message in another embodiment of the invention. Also, FIG. 4C is illustrated with the assumption that UE 1 does not yet have a network-connection upon making the determination of 400C. If UE 1 was already connected to one of networks 1 . . . N in 400C, and this network was deemed suitable for supporting the streaming communication session, it will be appreciated that 405C and 415C may actually occur prior to the determination of 400C, such that the presence server 181 is aware of UE 1's network before the process of FIG. 4C is initiated.

Upon receiving the call request message in 410C, the application server 170 announces the communication session to UEs 2 . . . N, 420C. Assume that each of UEs 2 . . . N receive the announce message, and, if necessary, UEs 2 . . . N each establish a connection to one of networks 1 . . . N of the RAN 120, 425C (e.g., as in 400A of FIG. 4A). In the example of FIG. 4C, it is assumed that, at 425C, UEs 2 . . . N do not yet have knowledge of UE 1's network-connection type (e.g., unless this information is bundled within the announce message). Accordingly, because UEs 2 . . . N do not yet have knowledge regarding the network-connection type of UE 1, it will be appreciated that the network upon which UEs 2 . . . N establish their respective connections in 425C can be based on the local network-selection rules of UEs 2 . . . N (e.g., to select WiFi over 3G, 3G over 2.5G, etc., to select the network with a highest pilot signal strength, etc.). In 425C, establishing the network connection includes obtaining call resources (e.g., a TCH, QoS resources, etc.) on the network to support wireless communications to/from UEs 2 . . . N and the RAN 120.

After establishing the network connection in 425C, UEs 2 . . . N each send a call accept message on a reverse-link channel to the RAN 120, which forwards the call accept message(s) to the application server 170, 430C. The call accept message(s) are acknowledgments of the call announcement message from 420C that indicate an acceptance of the announced communication session. Also, after establishing the network-connection in 425C, UEs 2 . . . N each send a network-connection report indicating the current network-connection information on the reverse-link channel to the RAN 120, which forwards the network-connection report(s) to the presence server 181, 435C (e.g., as in 405A of FIG. 4A). While not shown in FIG. 4C, the network-connection report(s) can be sent along with a message indicating the presence information of UEs 2 . . . N to the presence server 181. Also, while not shown in FIG. 4C, upon receiving the network-connection report(s) from UEs 2 . . . N, the presence server 181 updates record(s) to reflect the current network-connection type(s) for UEs 2 . . . N.

While the transmission of the network-connection report of 435C is shown as occurring after the transmission of the call accept message in 430C, it will be appreciated that the network-connection report can be sent before the call accept message in another embodiment of the invention. Also, FIG. 4C is illustrated with the assumption that UEs 2 . . . N do not yet have a network-connection upon making the determination to join the streaming communication session after receiving the announce message in 420C. If UEs 2 . . . N were already connected to one of networks 1 . . . N in 420C, and this network was deemed suitable for supporting the streaming communication session, it will be appreciated that 425C and 435C may actually occur prior to the receipt of the announce message in 420C, such that the presence server 181 is aware of the network(s) of UEs 2 . . . N before the announce message of 420C.

In 440C and 445C, UEs 1 . . . N begin the streaming communication session, whereby streaming media (e.g., video media) is exchanged between UE 1 and one or more of UEs 2 . . . N. In 450C, the presence server 181 sends a message to each of UEs 1 . . . N that notifies UEs 1 . . . N of the networks supporting the streaming communication session for each other UE participating in the streaming communication session (e.g., as in 405B of FIG. 4B). For example, the notification sent to UE 1 in 450C can indicate the network-connection type of UEs 2 . . . N, the notification sent to UE 2 in 450C can indicate the network-connection type of UE 1 and UEs 3 . . . N (if present), and so on.

Responsive to the notification of 450C at UE 1, UE 1 determines whether to switch to a different one of networks 1 . . . N based at least in part of the networks supporting the streaming communication session for UEs 2 . . . N, 455C (e.g., as in FIG. 410B of FIG. 4B). Examples of how 455C can be executed at UE 1 will be described in more detail below with respect to FIGS. 5A through 6C. After determining whether to switch to a different one of networks 1 . . . N, UE 1 selectively transitions to the different network if UE 1 determines to switch networks, and then notifies the presence server 181 of the network-connection change for UE 1, 460C.

Similarly, responsive to the notification(s) of 450C at UEs 2 . . . N, each of UEs 2 . . . N determines whether to switch to a different of networks 1 . . . N based at least in part of the networks supporting the streaming communication session of each other participating UE, 465C (e.g., as in FIG. 410B of FIG. 4B). Examples of how 465C can be executed at UEs 2 . . . N will be described in more detail below with respect to FIGS. 5A through 6C. After determining whether to switch to a different one of networks 1 . . . N, UEs 2 . . . N each selectively transition to the different network if the respective UE(s) determines to switch networks, and then each transitioning-UE notifies the presence server 181 of the network-connection change for the UE, 470C. If any of UEs 1 . . . N transition to a different network in 455C through 470C, the presence server 181 can notify each other participating UE of the network-change in 475C.

In the embodiment of FIG. 4C, the application server 170 and presence server 181 are shown as being separate network entities that operate, for the most part, independently. In another embodiment of the invention, the application server 170 presence 181 can be co-located and/or can coordinate with each other. In this case, it will be appreciated that the application server 170 can bundle the notification of UE 1's network with the announce message of 420C, and could potentially bundle network information of UEs 2 . . . N in a message to UE 1, such as an ACK to the call request message of 410C, in an example.

Figure 5B:
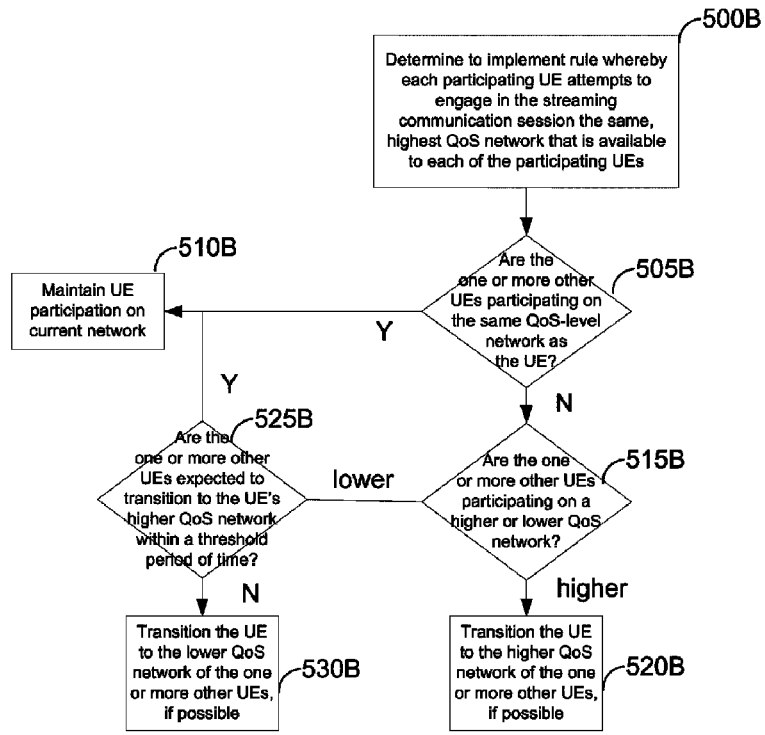

FIGS. 5A and 5B illustrate alternative examples of decision logic that can be implemented by a given UE in determining whether to switch to a different network based on information of network-connections of one or more other UEs participating in a streaming communication session in accordance with embodiments of the present invention. Accordingly, the entirety of the processes of FIGS. 5A and 5B can correspond to 410B of FIG. 4B, 455C at UE 1 in FIG. 4C and/or 465C at UEs 2 . . . N in FIG. 4C.

Referring to FIG. 5A, the given UE is provisioned with a rule to attempt to engage in the streaming communication session on the same network as each other UE participating in the streaming communication session, 500A. Accordingly, based on the network-connection notification from the presence server 181 in conjunction with the given UE's knowledge of its own network-connection, the given UE determines whether each other UE participating in the streaming communication session is connected to the same type of physical-layer network as the given UE, 505A. In other words, the given UE determines whether each participating UE is connected to a 3G network, a 2.5G network, a WiFi network, etc.

If the given UE determines that each participating UE is connected to the same type of physical-layer network in 505A, then the given UE determines the rule from 500A to be satisfied, and as such maintains its connection to the current physical-layer network, 510A. Otherwise, if the given UE determines that each participating UE is not connected to the same type of physical-layer network in 505A, the given UE determines whether the network of the other participating UEs is available for the given UE, 515A.

If the network of the other participating UEs is unavailable, then switching to the other network is not possible, and as such the given UE maintains the connection to its current physical-layer network, 515A. Otherwise, if the network of the other participating UEs is available, then the given UE selects a target network for its connection, 520A, and the given UE transitions itself to the target network if the target network is different from its current network, 525A. Depending on the implementation, the given UE can be configured to always-select the network-type of the other UE(s) if available in 520A. Alternatively, additional rules can be evaluated in the selection of 520A. For example, the specific network-types of the given UE and the network type of the other UE(s) can be evaluated to trigger a pre-defined target network selection in 520A (e.g., if given UE's network is 2.5G and other UE's network is 3G, set target network to 3G, etc.).

For example, as discussed above, the selection of 520A can be performed in a network-specific manner. In an example, assume that 2.5G networks are generally associated with lower QoS than 3G networks, and that the network-connection notification from the presence server 181 indicates each participating UE is connected to a 2.5G of 3G network. Accordingly, if the given UE is connected to a 2.5G network in this example, the given UE immediately selects the 3G network as its target network and can attempt a transition thereto in 525A. Otherwise, if the given UE is connected to a 3G network, the given UE can wait a threshold period of time to grant 2.5G-connected UEs an opportunity to transition to the 3G network. If the presence server 181 notifies the given UE that each of the 2.5G-connected UEs successfully transitioned to the 3G network within the threshold period of time, then the given UE selects its current network as the target network, and thereby performs no network transition. Otherwise, if the presence server 181 does not notify the given UE that each of the 2.5G-connected UEs successfully transitioned to the 3G network within the threshold period of time, then the given UE infers that some of the 2.5G-connected UEs were unable to transition to the 3G network, and thereby selects to downgrade to the 2.5G network as the target network, and transitions to the 2.5G network. Accordingly, the above-example reduces an occurrence whereby the participating UEs are constantly ping-ponging between networks by having different types of network-transitions being associated with different delays.

FIG. 5B corresponds to a more detailed implementation of the process of FIG. 5A. Referring to FIG. 5B, the given UE is provisioned with a rule to attempt to engage in the streaming communication session on a network supporting the highest-available QoS available that is available at each other UE participating in the streaming communication session, 500B. Accordingly, based on the network-connection notification from the presence server 181 in conjunction with the given UE's knowledge of its own network-connection, the given UE determines whether each other UE participating in the streaming communication session is connected to a physical-layer network with a QoS-level similar to the network of the given UE (e.g., with can be either the same network-type, or a different network-type with comparable QoS-performance expectations), 505B. In 505B, FIG. 5B presumes that at least one participating UE would be connected to a high-QoS network of the high-QoS network was available, such that each UE being connected to the same QoS-level network infers that the UEs are already operating on a highest-possible QoS network that is available at each of the UEs.

If the given UE determines that each participating UE is connected to the same QoS-level network in 505B, then the given UE determines the rule from 500B to be satisfied, and as such maintains its connection to the current physical-layer network, 510B. Otherwise, if the given UE determines that each participating UE is not connected to the same QoS-level network in 505B, the given UE determines whether the other participating UEs are operating on a higher QoS-level network or a lower QoS-level network, 515B.

If the network of the other participating UEs is determined to be a higher QoS-level network in 515B, then the given UE attempts to transition to the higher QoS-level network in 520B. Otherwise, if the network of the other participating UEs is determined to be a lower QoS-level network in 515B, then the given UE determines whether the other participating UEs are expected to be capable of transitioning to the given UE's own higher QoS-level network within a threshold period of time, 525B. For example, in 525B, the given UE can start a timer having a period corresponding to how long the given UE is willing to wait for a notification from the presence server 181 indicating that the other participating UEs have transitioned to the given UE's higher QoS-level network.

If the given UE determines that one or more of the other participating UEs are restricted to the lower QoS-level network and cannot transition to the higher QoS-level network in 525B, the given UE transitions itself to the lower QoS-level network of the one or more other participating UEs, if possible, 530B. Otherwise, if the given UE determines that one or more of the other participating UEs are capable of transitioning to the given UE's higher QoS-level network in 525B, the given UE maintains the connection to its current network, 510B.

Accordingly, the decision logic of FIG. 5A seeks to achieve each participating UE being connected to the same network, whereas the decision logic of FIG. 5B seeks to achieve each participating UE being connected to the highest 'shared' QoS-level network, or the network having a highest QoS-level expectation that is also capable of supporting each participating UE in their present location of the wireless communications system.

Figure 6B:
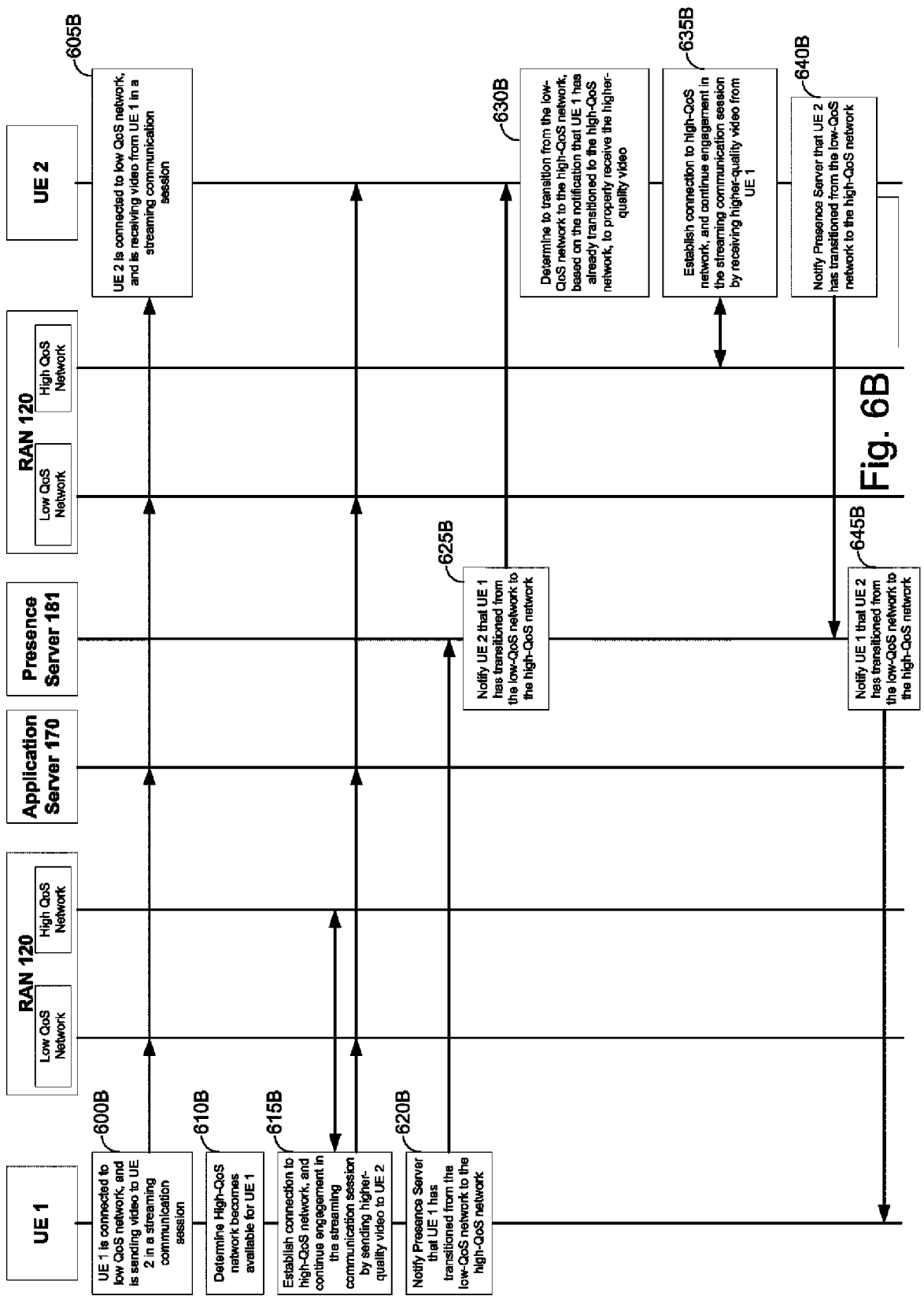

FIGS. 6A through 6C each illustrate an example implementation of the processes of FIGS. 5A and/or 5B in accordance with an embodiment of the invention.

Referring to FIG. 6A, assume that UE 1 and UE 2 are engaged in a streaming communication session whereby media is being streamed between UE 1 and UE 2 while UE 1 and UE 2 are both connected to a 2.5G network, 600A and 605A. As shown in FIG. 6A, in the direction of media streamed from UE 1 to UE 2, UE 1 transmits media on the reverse-link to the 2.5G network of the RAN 120, which forwards the media to the application server 170. The application server 170 in turn forwards the media to the 2.5G network of the RAN 120 that is serving UE 2, and the media is transmitted on the forward-link or downlink to UE 2. A similar procedure can be used for relaying media from UE 2 to UE 1 in the other direction.

Next, during the streaming communication session, assume that UE 1 enters a location area where the 2.5G network is unavailable, 610A. For example, UE 1 may be handed off to a different subnet that does not support 2.5G communication protocols. In this example, assume that the new location area for UE 1 can support UE 1's communication session on a 3G network. Accordingly, UE 1 establishes a connection to the 3G network, after which UE 1 continues its engagement in the streaming communication session on the 3G network, 615A. Accordingly, in 615A, UE 1 sends media on the reverse-link to the application server 170 via the 3G network, and likewise receives media on the downlink from the application server 170 via the 3G network.

In 620A, after setting up the connection to the 3G network, UE 1 transmits a network-connection report to the presence server 181 indicating that UE 1 is connected to the 3G network and is no longer connected to the 2.5G network. The presence server 181 notifies UE 2 that UE 1 has switched to the 3G network, 625A.

Accordingly, UE 2 determines to switch from the 2.5G network to the 3G network based on the notification that UE 1 is connected to the 3G network, 630A. For example, in 630A, UE 2 can execute the decision logic from FIG. 5A, such that UE 2 determines that UE 1 is not participating on the same network as UE 2 (505A), UE 2 determines that the 3G network is available (515A), UE 2 selects the 3G network as its target network (520A) and then UE 2 transitions to the 3G network (525A). In this case, the process of FIG. 5B would also result in UE 2 determining to switch to the 3G network. For example, in 630A, UE 2 can execute the decision logic from FIG. 5B, such that UE 2 determines that UE 1 is connected to a network with a different QoS-level from UE 2's 2.5G network (505B), UE 2 determines that the 3G network of UE 1 is a higher QoS-level network than the 2.5G network of UE 2 (515B), and UE 2 thereby transitions to the 3G network (520B).

UE 2 thereby establishes a connection to the 3G network, after which UE 2 continues its engagement in the streaming communication session on the 3G network, 635A. Accordingly, in 635A UE 2 sends media on the reverse-link to the application server 170 via the 3G network, and likewise receives media on the downlink from the application server 170 via the 3G network.

In 640A, after setting up the connection to the 3G network, UE 2 transmits a network-connection report to the presence server 181 indicating that UE 2 is connected to the 3G network and is no longer connected to the 2.5G network, 640A. The presence server 181 notifies UE 1 that UE 2 has switched to the 3G network, 645A. While not shown in FIG. 6A, the processes of FIGS. 5A and/or 5B can be executed at UE 1 upon receipt of the network-connection notification of 645A. In this case, because UE 1 is notified that UE 2 is connected to the 3G network, UE 1 will determine to maintain its connection to its own 3G network in either 510A of FIG. 5A or 510B of FIG. 5B.

As will be appreciated, FIG. 6A demonstrates how notifying participating UEs of a communication session with regard to their respective network-connections can result in the UEs achieving network conformity. Thus, in an example, assume that users of UE 1 and UE 2 are charged fees when the respective UEs are communicating on different network types, but not when UEs 1 and 2 are connected to the same network type. Thus, maintaining network conformity as in FIG. 6A can decrease the charges to the users of UE 1 and/or UE 2.

Referring to FIG. 6B, assume that UE 1 and UE 2 are engaged in a streaming communication session whereby video media is being streamed from UE 1 to UE 2 while UE 1 and UE 2 are both connected to a low-QoS network (e.g., 1x, 2.5G, 3G, etc.), 600B and 605B. As shown in FIG. 6B, UE 1 transmits video media on the reverse-link to the low-QoS network of the RAN 120, which forwards the video media to the application server 170. The application server 170 in turn forwards the video media to the low-QoS network of the RAN 120 that is serving UE 2, and the video media is transmitted on the forward-link or downlink to UE 2.

Next, during the streaming communication session, assume that UE 1 enters a location area where a high-QoS network (e.g., 3G, 4G, etc.) is available, 610B. For example, UE 1 may be handed off to a different subnet that supports a high-QoS network, such as 3G or 4G networks. Accordingly, UE 1 establishes a connection to the high-QoS network, after which UE 1 sends higher-quality video media on the high-QoS network to UE 2 as compared to the video media sent during 600B on the low-QoS network, 615B. Accordingly, in 615B, UE 1 sends higher-quality video media on the reverse-link to the application server 170 via the high-QoS network.

In 620B, after setting up the connection to the high-QoS network, UE 1 transmits a network-connection report to the presence server 181 indicating that UE 1 is connected to the high-QoS network and is no longer connected to the low-QoS network. The presence server 181 notifies UE 2 that UE 1 has switched to the high-QoS network, 625B.

Accordingly, UE 2 determines to switch from the low-QoS network to the high-QoS network based on the notification that UE 1 is connected to the high-QoS network, 630B. For example, in 630B, UE 2 can execute the decision logic from FIG. 5A, such that UE 2 determines that UE 1 is not participating on the same network as UE 2 (505A), UE 2 determines that the high-QoS network is available (515A), UE 2 selects the high-QoS network as its target network (520A) and then UE 2 transitions to the high-QoS network (525A). In this case, the process of FIG. 5B would also result in UE 2 determining to switch to the high-QoS network. For example, in 630B, UE 2 can execute the decision logic from FIG. 5B, such that UE 2 determines that UE 1 is connected to a network with a different QoS-level from UE 2's low-QoS network (505B), UE 2 determines that the high-QoS network of UE 1 is a higher QoS-level network than the low-QoS network of UE 2 (515B), and UE 2 thereby transitions to the high-QoS network (520B).

UE 2 thereby establishes a connection to the high-QoS network, after which UE 2 receives the video media from UE 1 at the higher quality, 635B. Accordingly, in 635B, UE 2 receives media on the downlink from the application server 170 via the high-QoS network at the higher-video quality which was unavailable while UE 2 remained on the low-QoS network.

In 640B, after setting up the connection to the high-QoS network, UE 2 transmits a network-connection report to the presence server 181 indicating that UE 2 is connected to the high-QoS network and is no longer connected to the low-QoS network, 640B. The presence server 181 notifies UE 1 that UE 2 has switched to the high-QoS network, 645B. While not shown in FIG. 6A, the processes of FIGS. 5A and/or 5B can be executed at UE 1 upon receipt of the network-connection notification of 645B. In this case, because UE 1 is notified that UE 2 is connected to the high-QoS network, UE 1 will determine to maintain its connection to its own high-QoS network in either 510A of FIG. 5A or 510B of FIG. 5B.

In an example, if the presence server 181 had not reported UE 2's transition to the high-QoS network within a threshold period of time, UE 1 may infer UE 2 remains on the low-QoS network and transition back to the 2.5G network because UE 1 will infer the higher-quality media is being 'wasted', or cannot be received properly, so long as UE 2 remains on the low-QoS network.

As will be appreciated, FIG. 6B demonstrates how notifying participating UEs of a communication session with regard to their respective network-connections can result in the UEs increasing their efficiency with regard to resource usage. For example, if UE 2 did not transition to the high-QoS network, the benefits of the higher-quality video media would not be achieved by UE 2, such that UE 1's resources that are allocated to obtaining the higher-quality video stream would be wasted.

Referring to FIG. 6C, assume that UE 1 and UE 2 are engaged in a streaming communication session whereby video media is being streamed from UE 1 to UE 2 while UE 1 and UE 2 are both connected to a high-QoS network (e.g., 1x, 2.5G, 3G, etc.), 600C and 605C. As shown in FIG. 6C, UE 1 transmits video media on the reverse-link to the high-QoS network of the RAN 120, which forwards the high-quality video media to the application server 170. The application server 170 in turn forwards the high-quality video media to the high-QoS network of the RAN 120 that is serving UE 2, and the high-quality video media is transmitted on the forward-link or downlink to UE 2.

Next, during the streaming communication session, assume that UE 2 enters a location area where the high-QoS network (e.g., 3G, 4G, etc.) is no longer available, 610C. For example, UE 1 may be handed off to a different subnet that does not support the high-QoS network, and rather only supports low-QoS networks. Accordingly, UE 2 establishes a connection to the low-QoS network, after which UE 2 receives the video media at a lower-quality on the low-QoS network as compared to the high-quality video media sent during 600C on the high-QoS network, 615C. Accordingly, in 615C, UE 2 sends lower-quality video media on the forward-link, even though the video media at this particular point in time is still being transmitted by UE 1 at the higher-quality level.

In 620C, after setting up the connection to the low-QoS network, UE 2 transmits a network-connection report to the presence server 181 indicating that UE 2 is connected to the low-QoS network and is no longer connected to the high-QoS network. The presence server 181 notifies UE 1 that UE 2 has switched to the low-QoS network, 625C.

Accordingly, UE 1 determines to switch from the high-QoS network to the low-QoS network based on the notification that UE 2 is connected to the low-QoS network, 630C. For example, in 630C, UE 1 can execute the decision logic from FIG. 5A, such that UE 1 determines that UE 2 is not participating on the same network as UE 1 (505A), UE 1 determines that the low-QoS network is available (515A), UE 1 selects the low-QoS network as its target network (520A) and then UE 1 transitions to the low-QoS network (525A). In this case, the process of FIG. 5B would also result in UE 1 determining to switch to the low-QoS network. For example, in 630C, UE 1 can execute the decision logic from FIG. 5B, such that UE 1 determines that UE 2 is connected to a network with a different QoS-level from UE 1's high-QoS network (505B), UE 1 determines that the low-QoS network of UE 2 is a lower QoS-level network than the high-QoS network of UE 1 (515B), UE 1 infers UE 2 is not expected to be capable of switching back to the high-QoS level since UE 2 downgraded its network (525B) and UE 1 thereby transitions to the low-QoS network (530B).

UE 1 establishes a connection to the low-QoS network, after which UE 1 sends the video media at a lower-quality level, 635C. Accordingly, in 635C, UE 1 sends video media on the reverse-link to the application server 170 via the low-QoS network at the lower-video quality, even though UE 1 is capable of transmitting at the higher video-quality.

In 640C, after setting up the connection to the low-QoS network, UE 1 transmits a network-connection report to the presence server 181 indicating that UE 1 is connected to the low-QoS network and is no longer connected to the high-QoS network, 640C. The presence server 181 notifies UE 2 that UE 1 has switched to the low-QoS network, 645C. While not shown in FIG. 6A, the processes of FIGS. 5A and/or 5B can be executed at UE 1 upon receipt of the network-connection notification of 645B. In this case, because UE 2 is notified that UE 1 is connected to the low-QoS network, UE 2 will determine to maintain its connection to its own low-QoS network in either 510A of FIG. 5A or 510B of FIG. 5B.

In an example, if the presence server 181 had not reported UE 2's transition to the high-QoS network within a threshold period of time, UE 1 may infer UE 2 remains on the low-QoS network transition back to the 2.5G network because UE 1 will infer the higher-quality media is being 'wasted', or cannot be received properly, so long as UE 2 remains on the low-QoS network.

As will be appreciated, FIG. 6C demonstrates how notifying participating UEs of a communication session with regard to their respective network-connections can result in the UEs increasing their efficiency with regard to resource usage. For example, if UE 1 did not transition to the low-QoS network, UE 1's resources that are allocated to sending the higher-quality video stream would be wasted because UE 2 would no longer be capable of receiving the video media at the higher-quality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of notifying one or more user equipments (UEs) of network-connection information within a wireless communications system, comprising:

receiving a network-connection report from a given UE that identifies a type of physical-layer network to which the given UE is connected; and in response to a determination that the given UE is engaged in a communication session with at least one other UE, sending a notification message to the at least one other UE that indicates the type of physical-layer network to which the given UE is connected, wherein the sending step occurs during an in-call phase of the communication session, and wherein the sending step is triggered in response to the network-connection report corresponding to a supplemental network-connection report that is sent from the given UE and indicates that the given UE has switched to a different type of physical-layer network during the communication session.

2. The method of claim 1, further comprising:

receiving at least one other network-connection report from the at least one other UE that identifies a type of physical-layer network to which the at least one other UE is connected, wherein the sending step further sends another notification to the given UE indicating the type of physical-layer network to which the at least one other UE is connected.

3. The method of claim 1, further comprising:

receiving an initial network-connection report from the given UE that identifies an initial type of physical-layer network to which the given UE is connected during call set-up of the communication session;

sending an initial notification message to the at least one other UE that indicates the initial type of physical-layer network to which the given UE is connected during the call set-up.

4. The method of claim 3, wherein the at least one other UE includes a call originator of the communication session and the initial notification message corresponds to an acknowledgment (ACK) of a call request message from the call originator that requests initiation of the communication session.

5. The method of claim 3, wherein the at least one other UE includes a call target of the communication session and the initial notification message corresponds to a call announcement message that announces the communication session to the call target.

6. A method of selectively transitioning between physical-layer networks during a communication session within a wireless communications system, comprising:

determining, at a given UE, to engage in a communication session with at least one other UE;

receiving a notification message at the given UE, the notification message indicating a type of physical-layer network to which the at least one other UE is connected;

determining a network-type and/or Quality of Service (QoS) performance expectation for (i) the given UE's current physical-layer network and (ii) the type of physical-layer network to which the at least one other UE is connected;

comparing the network-type and/or QoS performance expectation for (i) and (ii);

determining a target physical-layer network for supporting the given UE's participation in the communication session based on the comparison by selecting (i) as the target physical-layer network in response to the comparison indicating that the network-type and/or QoS performance expectation for (i) and (ii) are substantially equal; and selectively transitioning to the target physical-layer network based on the target physical-layer network determination.

7. The method of claim 6, wherein the determining steps, the receiving step and the selectively transitioning step occur during set-up of the communication session.

8. The method of claim 7, wherein the given UE corresponds to a call originator of the communication session and the notification message corresponds to an acknowledgment (ACK) of a call request message from the call originator that requests initiation of the communication session.

9. The method of claim 7, wherein the given UE corresponds to a call target of the communication session and the notification message corresponds to a call announcement message that announces the communication session to the call target.

10. The method of claim 6, wherein the determining steps, the receiving step and the selectively transitioning step occur during an in-call phase of the communication session.

11. The method of claim 6, wherein the selectively transitioning step does not transition the given UE to a different physical-layer network if the network-type and/or QoS performance expectation of the target physical-layer network corresponds to the QoS performance expectation of the given UE's current physical-layer network.

12. The method of claim 6, wherein the selectively transitioning step transitions the given UE to a different physical-layer network if the network-type and/or QoS performance expectation of the target physical-layer network does not correspond to the QoS performance expectation of the given UE's current physical-layer network.

13. The method of claim 6, wherein the determining a target physical-layer network step further includes:

selecting (i) as the target physical-layer network if the comparison indicates that the network-type and/or QoS performance expectation for (i) and (ii) are substantially equal.

14. A server configured to notify one or more user equipments (UEs) of network-connection information within a wireless communications system, comprising:

means for receiving a network-connection report from a given UE that identifies a type of physical-layer network to which the given UE is connected; and means for in response to a determination that the given UE is engaged in a communication session with at least one other UE, sending a notification message to the at least one other UE that indicates the type of physical-layer network to which the given UE is connected, wherein the means for sending sends the notification message during an in-call phase of the communication session, and wherein the means for sending sends the notification message in response to the network-connection report corresponding to a supplemental network-connection report that is sent from the given UE and indicates that the given UE has switched to a different type of physical-layer network during the communication session.

15. A user equipment (UE) configured to selectively transition between physical-layer networks during a communication session within a wireless communications system, comprising:

means for determining to engage in the communication session with at least one other UE;

means for receiving a notification message indicating a type of physical-layer network to which the at least one other UE is connected;

means for determining a network-type and/or Quality of Service (QoS) performance expectation for (i) the given UE's current physical-layer network and (ii) the type of physical-layer network to which the at least one other UE is connected;

means for comparing the network-type and/or QoS performance expectation for (i) and (ii);

means for determining a target physical-layer network for supporting participation in the communication session based on the comparison by selecting (i) as the target physical-layer network in response to the comparison indicating that the network-type and/or QoS performance expectation for (i) and (ii) are substantially equal; and means for selectively transitioning to the target physical-layer network based on the target physical-layer network determination.

16. A server configured to notify one or more user equipments (UEs) of network-connection information within a wireless communications system, comprising:

logic configured to receive a network-connection report from a given UE that identifies a type of physical-layer network to which the given UE is connected; and logic configured to , in response to a determination that the given UE is engaged in a communication session with at least one other UE, send a notification message to the at least one other UE that indicates the type of physical-layer network to which the given UE is connected, wherein the logic configured to send sends the notification message during an in-call phase of the communication session, and wherein the logic configured to send sends the notification message in response to the network-connection report corresponding to a supplemental network-connection report that is sent from the given UE and indicates that the given UE has switched to a different type of physical-layer network during the communication session.

17. A user equipment (UE) configured to selectively transition between physical-layer networks during a communication session within a wireless communications system, comprising:

logic configured to determine to engage in a communication session with at least one other UE;

logic configured to receive a notification message indicating a type of physical-layer network to which the at least one other UE is connected;

logic configured to determine a network-type and/or Quality of Service (QoS) performance expectation for (i) the given UE's current physical-layer network and (ii) the type of physical-layer network to which the at least one other UE is connected;

logic configured to compare the network-type and/or QoS performance expectation for (i) and (ii);

logic configured to determine a target physical-layer network for supporting participation in the communication session based on the comparison by selecting (i) as the target physical-layer network in response to the comparison indicating that the network-type and/or QoS performance expectation for (i) and (ii) are substantially equal; and logic configured to selectively transition to the target physical-layer network based on the target physical-layer network determination.

18. A non-transitory computer readable medium including instructions, which, when executed by a server configured to notify one or more user equipments (UEs) of network-connection information within a wireless communications system, causes the server to perform operations, the instructions comprising:

program code to receive a network-connection report from a given UE that identifies a type of physical-layer network to which the given UE is connected; and program code to, in response to a determination that the given UE is engaged in a communication session with at least one other UE, send a notification message to the at least one other UE that indicates the type of physical-layer network to which the given UE is connected, wherein the program code to send sends the notification message during an in-call phase of the communication session, and wherein the program code to send sends the notification message in response to the network-connection report corresponding to a supplemental network-connection report that is sent from the given UE and indicates that the given UE has switched to a different type of physical-layer network during the communication session.

19. A non-transitory computer readable medium including instructions, which, when executed by a user equipment (UE) configured to selectively transition between physical-layer networks during a communication session within a wireless communications system, causes the UE to perform operations, the instructions comprising:

program code to determine to engage in a communication session with at least one other UE;

program code to receive a notification message indicating a type of physical-layer network to which the at least one other UE is connected;

program code to determine a network-type and/or Quality of Service (QoS) performance expectation for (i) a given UE's current physical-layer network and (ii) the type of physical-layer network to which the at least one other UE is connected;

program code to compare the network-type and/or QoS performance expectation for (i) and (ii);

program code to determine a target physical-layer network for supporting participation in the communication session based on the comparison by selecting (i) as the target physical-layer network in response to the comparison indicating that the network-type and/or QoS performance expectation for (i) and (ii) are substantially equal; and program code to selectively transition to the target physical-layer network based on the target physical-layer network determination.

* * * * *